United States Patent
Jansen

(10) Patent No.: US 8,991,326 B2
(45) Date of Patent: Mar. 31, 2015

(54) DISPLACEMENT HULL FORM NOT SUBJECT TO THE LIMITATION OF HULL SPEED

(71) Applicant: Robert Carl Jansen, Anaheim, CA (US)

(72) Inventor: Robert Carl Jansen, Anaheim, CA (US)

(*) Notice: Subject to any disclaimer, the term of this patent is extended or adjusted under 35 U.S.C. 154(b) by 278 days.

(21) Appl. No.: 13/742,278

(22) Filed: Jan. 15, 2013

(65) Prior Publication Data

US 2014/0196655 A1    Jul. 17, 2014

(51) Int. Cl.
*B63B 1/04* (2006.01)
*B63B 1/06* (2006.01)
*B63B 1/08* (2006.01)
*B63H 1/16* (2006.01)
*B63H 5/16* (2006.01)
*B63H 25/32* (2006.01)
*B63H 25/46* (2006.01)
*B63H 5/10* (2006.01)

(52) U.S. Cl.
CPC . *B63B 1/042* (2013.01); *B63B 1/04* (2013.01); *B63H 1/16* (2013.01); *B63B 1/063* (2013.01); *B63B 1/08* (2013.01); *B63H 5/16* (2013.01); *B63H 2005/103* (2013.01); *B63H 2025/465* (2013.01)
USPC ............ 114/288; 114/290; 440/66; 440/68

(58) Field of Classification Search
CPC ............. B63B 1/00; B63B 1/02; B63B 1/04; B63B 1/042; B63B 1/06; B63B 1/063; B63B 1/08; B63B 1/10; B63B 1/12; B63B 1/125; B63B 2001/126; B63B 2001/183; B63B 2001/186; B63B 2001/201; B63B 2001/203; B63B 2001/204; B63B 2001/205; B63B 2001/207; B63B 2001/208; B63H 1/16; B63H 2005/103; B63H 5/16; B63H 2025/465
USPC .......... 114/56.1, 61.1, 61.2, 61.21, 61.27–63, 114/271, 283, 284, 288–291; 440/38, 440/66–70; D12/304, 310–314
See application file for complete search history.

(56) References Cited

U.S. PATENT DOCUMENTS

| 33,364 | A | * | 9/1861 | Renwick .................... 440/70 |
| 1,991,512 | A | * | 2/1935 | Miller ........................ 440/38 |
| 4,828,518 | A | | 5/1989 | Kouda et al. |
| 5,265,554 | A | | 11/1993 | Meredith |
| 6,314,903 | B2 | | 11/2001 | Robinson et al. |

FOREIGN PATENT DOCUMENTS

| GB | 124982 | A | * | 4/1919 |
| JP | 61075093 | A | | 4/1986 |
| KR | 10-2010-0000240 | A | | 1/2001 |
| WO | WO 2010037253 | A1 | * | 4/2010 |

OTHER PUBLICATIONS

International Search Report and Written Opinion from the Korean Intellectual Property Office dated Sep. 24, 2013.

* cited by examiner

*Primary Examiner* — Ajay Vasudeva
(74) *Attorney, Agent, or Firm* — Plager Schack LLP

(57) ABSTRACT

A displace hull with a shape that is both laterally symmetric and fore-to-aft symmetric is disclosed. The hull includes a pair of channels that help to manage a flow of water around the hull. The hull also includes sponsons and propellers that are located amidships on the port and starboard sides.

6 Claims, 3 Drawing Sheets

DISPLACEMENT HULL FORM NOT SUBJECT TO THE LIMITATION OF HULL SPEED

BACKGROUND OF THE PRESENT DISCLOSURE

1. Field of the Present Disclosure The present disclosure is directed to a hull form and system for creating a hull form that is not subject to the limitation of hull speed.

2. Related Art

A conventional displacement hull relies on the brute force of the boat's engine, which is transferred into the water via one or more propellers, to push the hull through the water. As the hull moves through the water, the water is pushed out of the way. The flow of water away from the hull creates a bow wave. The wavelength of the bow wave interacts with the waterline length of the hull, driving the hull higher in the water as the speed of the hull increases. Above a certain speed, the hull would theoretically be driven completely out of the water. In practice, of course, the hull must remain in the water, so the hull has a maximum speed it can achieve, regardless of how powerful its engine is. The actual top speed varies based on a number of factors, including the size and shape of the hull. Overall, this effect is known as the hull speed limitation.

Different solutions have been proposed to address the limitation of hull speed, but all current solutions are incomplete and limited. For example, U.S. Pat. No. 297,279 issued to Holden (hereinafter "Holden") purports to pull the bow flow through the system. The bow is largely intact, so Holden cannot contain and manage the entirety of the system flow. Holden cannot create a wake, so the design is limited to canal boats and the like. U.S. Pat. No. 4,505,684 issued to McDonald (hereinafter "McDonald") fails to properly accommodate or handle wave motion. Thus, McDonald will only function in relatively smooth water.

SUMMARY OF THE PRESENT DISCLOSURE

The present disclosure provides a displacement hull that is not subject to the hull speed limitation, which results in a significant increase in efficiency and maneuverability, as well as other advantages apparent from the discussion herein.

According to one aspect of the present disclosure, a displacement hull for a water craft includes a shape that is laterally symmetric and fore-to-aft symmetric. The hull includes starboard and port channels, sponsons, and propellers. The channels are configured to at least partially manage a flow of water around the hull. The sponsons are disposed amidships. The sponsons are each configured to form a tunnel, one starboard and one port, with their corresponding channels. Each sponson is further configured to form a flume, one starboard and one port, with the hull. The starboard propeller is disposed in the starboard tunnel, and the port propeller is disposed in the port tunnel.

Additional features, advantages, and aspects of the present disclosure may be set forth or apparent from consideration of the following detailed description, drawings, and claims. Moreover, it is to be understood that both the foregoing summary of the present disclosure and the following detailed description are exemplary and intended to provide further explanation without limiting the scope of the present disclosure as claimed.

BRIEF DESCRIPTION OF THE DRAWINGS

The accompanying drawings, which are included to provide a further understanding of the present disclosure, are incorporated in and constitute a part of this specification, illustrate aspects of the present disclosure and together with the detailed description serve to explain the principles of the present disclosure. No attempt is made to show structural details of the present disclosure in more detail than may be necessary for a fundamental understanding of the present disclosure and the various ways in which it may be practiced. In the drawings.

DETAILED DESCRIPTION OF THE PRESENT DISCLOSURE

Figure 1:
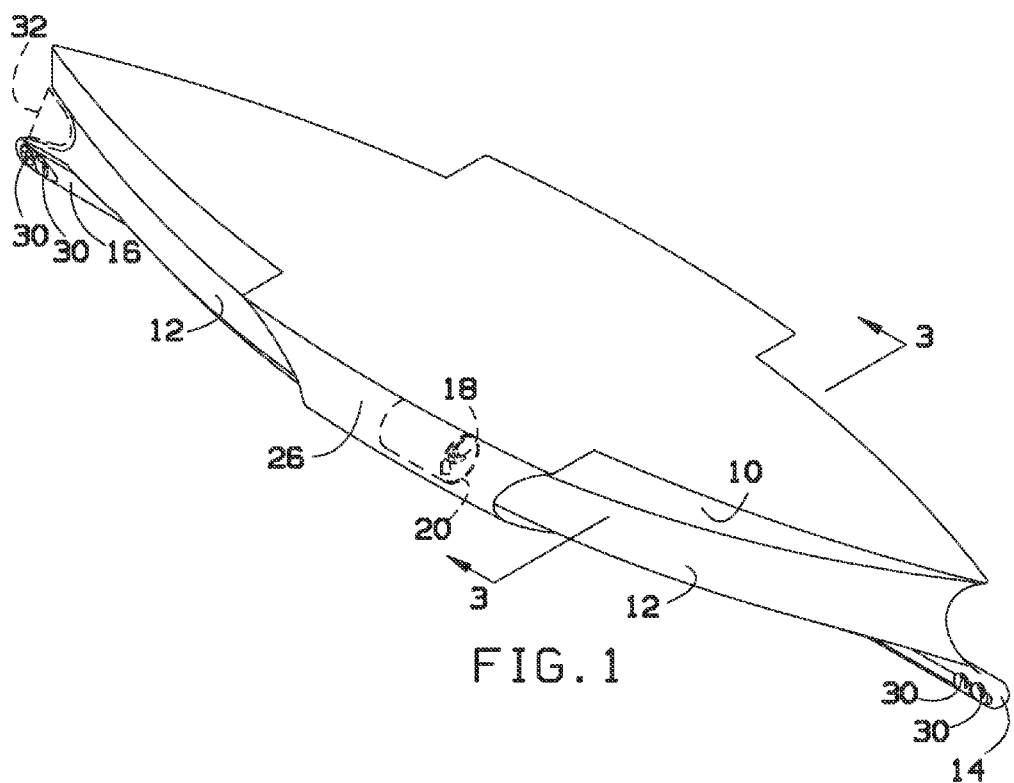
FIG. 1 shows a perspective view of a hull according to an aspect of the present disclosure.

The aspects of the present disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the present disclosure. The examples used herein are intended merely to facilitate an understanding of ways in which the present disclosure may be practiced and to further enable those of skill in the art to practice the aspects of the present disclosure. Accordingly, the examples and aspects herein should not be construed as limiting the scope of the present disclosure, which is defined solely by the appended claims and applicable law. Moreover, it is noted that like reference numerals represent similar parts throughout the drawings.

According to an aspect of the present disclosure, a hull may be formed by first visualizing a Venturi tube with a centerline drawn down the middle. The tube may be split at the center line, and each half may be flipped so that the bulges are now at the center. The two halves may be joined, and the center lines (which now lie at the outside of the tube) may be made solid, thereby forming two channels.

FIG. 1 shows an exemplary hull 10 formed using these design principles. The top or horizontal profile of the hull 10 may correspond to the center bulge in the rearranged Venturi tube described above. For example, when viewed from above, the hull may be symmetric both laterally (i.e. side-to-side) and vertically (i.e. bow-to-stern). Variation from bow-to-stern symmetry is optional according to the requirements of a particular design, without departing from the spirit and scope of the present disclosure, including the claims. The hull may include a channel 12 along each side, which may correspond to the channels in the rearranged Venturi tube. The hull 10 may also include a sponson 26 on each side, and each sponson 26 may correspond to the solid center line in the rearranged Venturi tube. The sponsons 26 may be removed from a particular design, but the overall performance of the hull may suffer.

One or more variable pitch propellers 18 may be located in the channel 12 at the sponson 26. The propeller 18 may be a ducted propeller fitted with a Kort nozzle 20. For example, each channel 12 may include a pair of counter-rotating, variable pitch propellers 18. The propellers 18 may be connected to or mounted on one or more pylons 22. The aft section of the hull 10 may be viewed as a time-reversed version of the forward section, hence the utility of counter-rotating propellers 18. On a more practical level, the counter-rotating pairs of propellers 18 are self-canceling with respect to gyroscopic forces while providing system redundancy.

The shape of the hull 10, the sponsons 26, and the position of propulsion 18 may allow the hull 10 to maintain completely or approximately complete dynamic closure. As a result, the design may be more efficient than traditional displacement hulls. For example, the hull 10 may consume up to 40% less fuel. The hull 10 may have improved dynamics, such as, e.g., reduce pitch, reduce roll, and reduced yaw. The hull 10 may also have improved maneuverability, including, for example, a nautical equivalent of brakes and improved crash avoidance. In addition, the hull 10 may include a bow extension 14 and a stern extension 16, and each extension 14, 16 may include one or more side thrusters 30. This configuration may allow the hull to operate with a rudder. Nonetheless, the hull may include an optional emergency rudder 32.

Figure 2:
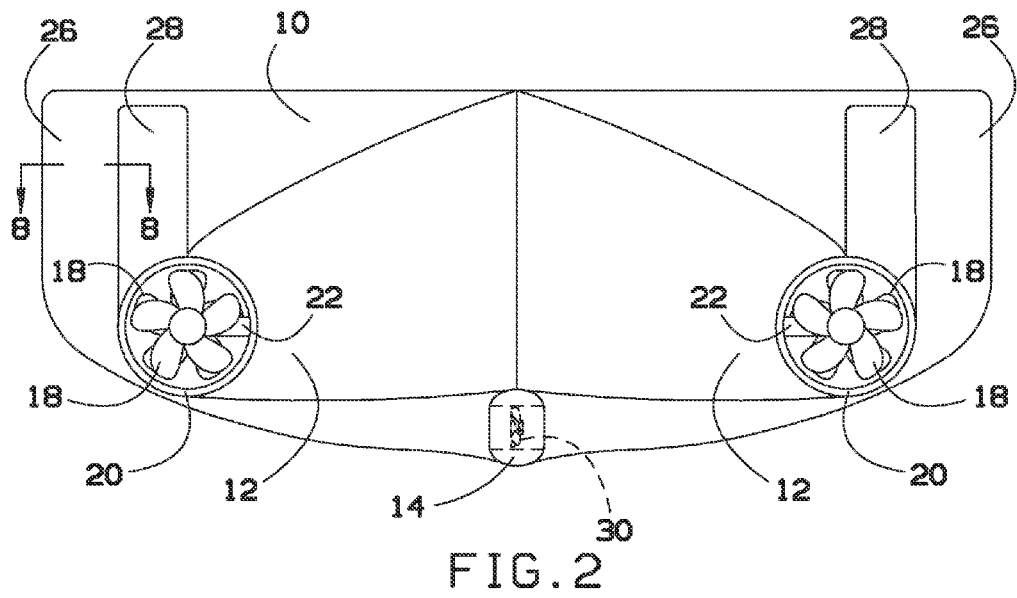
FIG. 2 shows a front view of the hull of FIG. 1.

FIG. 2 shows a front view of the exemplary hull 10. The channels 12 may begin at the bow with a height equal to the hull 10. The channels 12 may narrow as they approach the sponsons 26. At the sponsons 26, the channels may become tubes or tunnels that are sized to direct all flow through the propellers 18, except that the tunnel may have an open top, forming a flume 28 with the sponson 26. This configuration may allow the channel 12 to direct the majority of the flow through the propeller 18 while still accommodating wave motion. For example, the open upper boundary and flume 28 may facilitate better flow management across a variety of sea states and wave levels. Moreover, doubling the velocity quadruples the friction in a normal Venturi tube. Having an open upper boundary, such as the flume 28, however, may allow the system flow to redistribute, which may reduce average velocity and overall friction.

Figure 3:
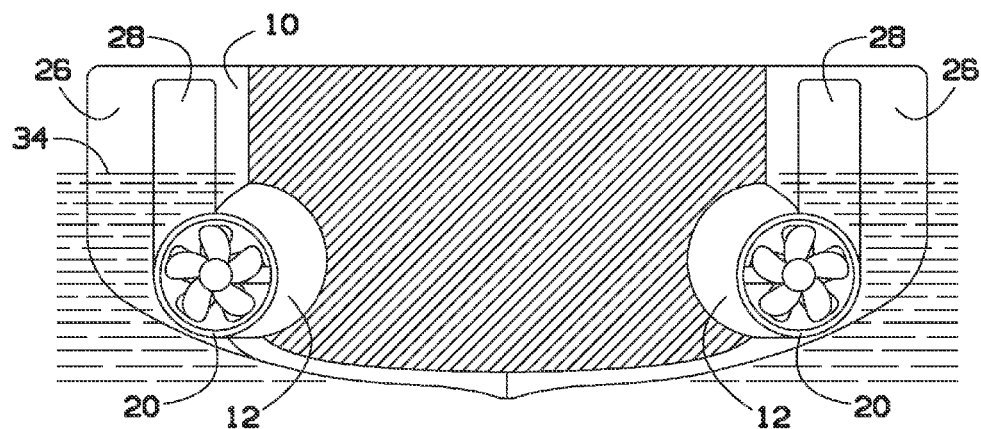
FIG. 3 shows a section view of the hull of FIG. 1.

FIG. 3 shows a cross-section of the hull 10 taken along line 3-3 in FIG. 1. Waterline 34 provides an example of how the hull 10 may sit in the water. Since the hull 10 may manage or control the flow of water around the craft and may create a dynamically closed system, the hull 10 may maintain the same waterline 34 at any speed. The top speed of the hull 10 may be limited by the power output of the associated motor. Thus, the hull 10 may not suffer from the hull speed limitation of conventional displacement hulls.

Figure 4:
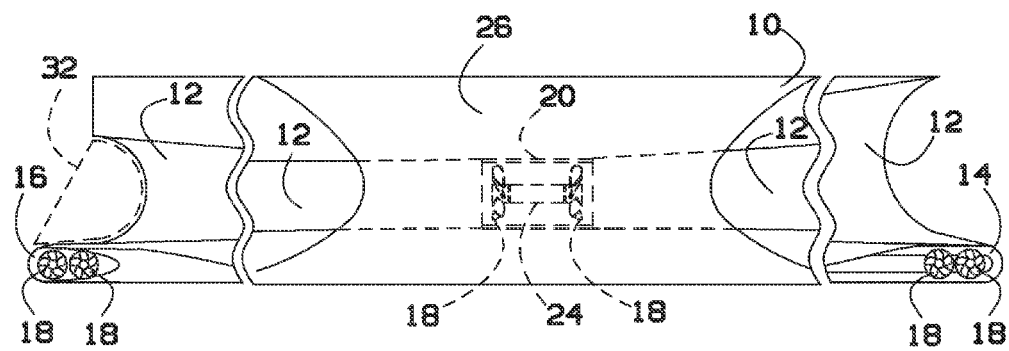
FIG. 4 shows a side view of the hull of FIG. 1.

FIG. 4 shows a side view of the exemplary hull 10. Side thrusters 18 may be used for steering, eliminating the need for a rudder. Nonetheless, an emergency rudder 32 may be provided. The fore and aft profiles of the sponsons 12 may be similar to the bow and stern profiles of the channels 12.

Figure 5:
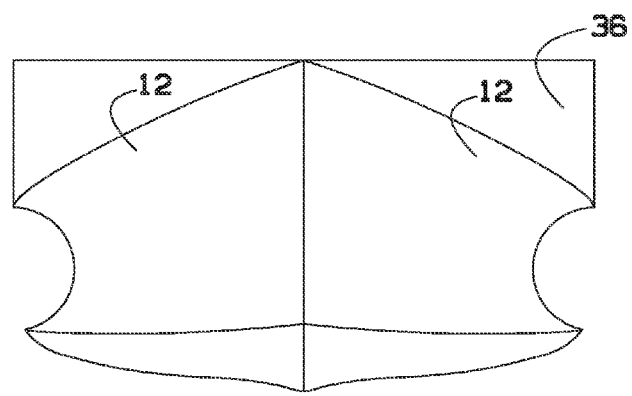
FIG. 5 shows a front view of a simplified hull, according to an aspect of the present disclosure.
Figure 6:
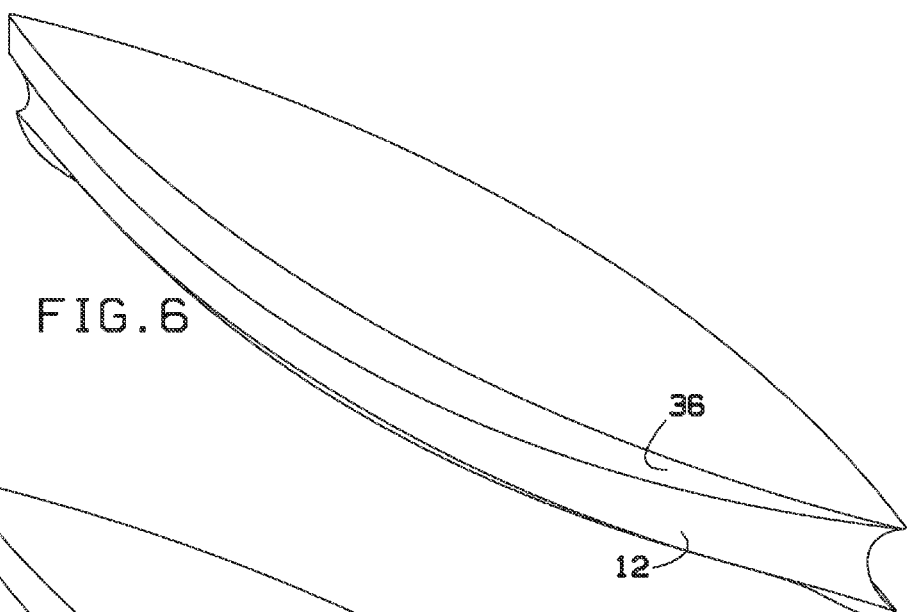
FIGS. 6 and 7 show a perspective view the hull of FIG. 5.
Figure 7:
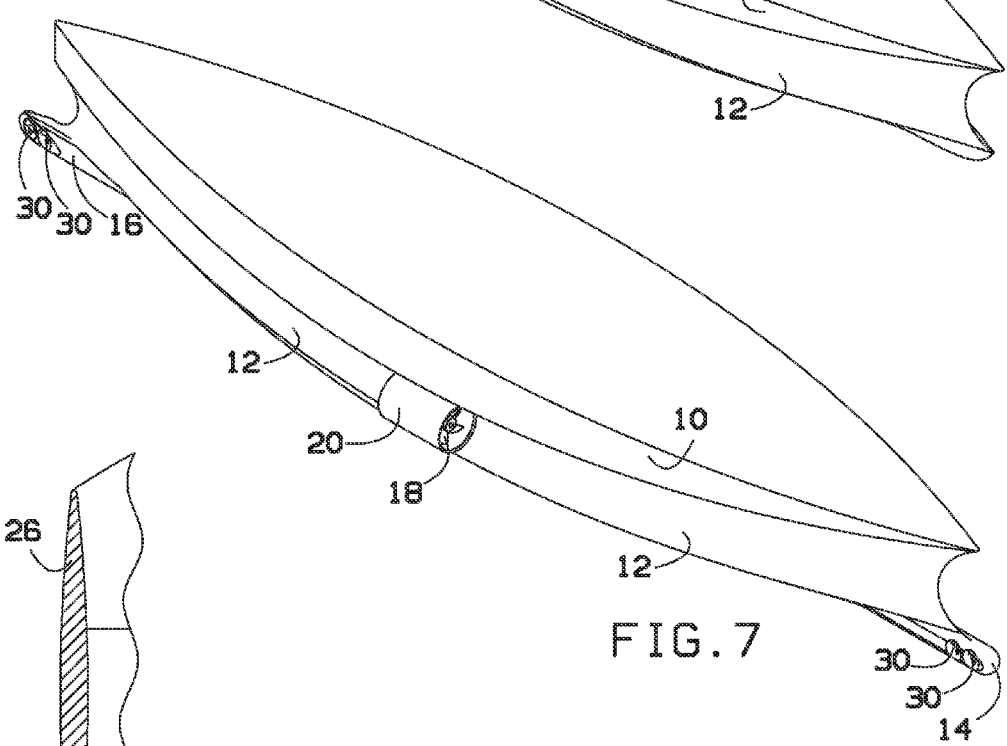

FIG. 5 shows a front view of a simplified hull 36, according to an aspect of the present disclosure. FIGS. 6 and 7 show a perspective view the hull of FIG. 5. These simplified views may make it easier to understand the relationship between the components discussed herein.

Figure 8:
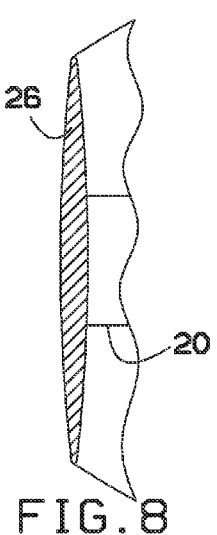
FIG. 8 shows a section view of the hull of FIG. 1.

FIG. 8 shows a section view of the exemplary hull 10 taken along the line 8-8 in FIG. 2. For example, the horizontal profile of the outer wall of the sponson may be seen. As with the hull 10, the sponson wall may be symmetric both laterally and fore-to-aft.

While the present disclosure has been described in terms of exemplary aspects, those skilled in the art will recognize that the present disclosure can be practiced with modifications in the spirit and scope of the appended claims. These examples given above are merely illustrative and are not meant to be an exhaustive list of all possible designs, aspects, applications or modifications of the present disclosure.

What is claimed is:

1. A displacement hull for a water craft, the hull comprising a shape that is laterally symmetric and fore-to-aft symmetric, the hull further comprising;
    a starboard channel and a port channel, the channels configured to at least partially manage a flow of water around the hull;
    a starboard sponson disposed amidships, the starboard sponson configured to form a starboard tunnel with the starboard channel, the starboard sponson further configured to form a starboard flume with the hull;
    a port sponson disposed amidships, the port sponson configured to form a port tunnel with the port channel, the port sponson further configured to form a port flume with the hull;
    a starboard propeller disposed in the starboard tunnel; and
    a port propeller disposed in the port tunnel;
    the starboard tunnel comprising an open top connecting the starboard tunnel to the starboard flume, the starboard flume extending substantially above the starboard tunnel; and
    the port tunnel comprising an open top connecting the port tunnel to the port flume; the port flume extending substantially above the port tunnel.

2. The hull of claim 1, further comprising:
    at least one of a bow extension and a stern extension.

3. The hull of claim 2, further comprising;
    at least one thruster disposed in the at least one of a bow extension and a stern extension.

4. The hull of claim 1, further comprising:
    an emergency rudder.

5. The hull of claim 1, wherein:
    the starboard propeller comprises a variable pitch propeller; and
    the port propeller comprises a variable pitch propeller.

6. The hull of claim 1, wherein:
    the starboard propeller comprises a pair of counter-rotating, variable pitch propellers; and
    the port propeller comprises a pair of counter-rotating, variable pitch propellers.

* * * * *